(12) United States Patent
Oh et al.

(10) Patent No.: US 9,485,843 B2
(45) Date of Patent: Nov. 1, 2016

(54) LIGHTING CONTROL APPARATUS

(75) Inventors: Tae Keun Oh, Suwon (KR); Ho Chan Cho, Suwon (KR); Chang Seob Kim, Seoul (KR); Heui Sam Kwag, Suwon (KR); Jung Hwan Park, Busan (KR); Jin Sun Jung, Suwon (KR); Dong-Won Lee, Yongin-si (KR); Sang Kyeong Yun, Suwon (KR); Haeng Seok Yang, Yongin-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 628 days.

(21) Appl. No.: 13/505,687

(22) PCT Filed: Nov. 2, 2010

(86) PCT No.: PCT/KR2010/007654
§ 371 (c)(1),
(2), (4) Date: Aug. 23, 2012

(87) PCT Pub. No.: WO2011/053089
PCT Pub. Date: May 5, 2011

(65) Prior Publication Data
US 2012/0306378 A1 Dec. 6, 2012

(30) Foreign Application Priority Data

Nov. 2, 2009 (KR) .................. 10-2009-0104991
Nov. 2, 2009 (KR) .................. 10-2009-0105686
Nov. 3, 2009 (KR) .................. 10-2009-0105544
Nov. 3, 2009 (KR) .................. 10-2009-0105545
Nov. 3, 2009 (KR) .................. 10-2009-0105689
Nov. 6, 2009 (KR) .................. 10-2009-0107103
Nov. 9, 2009 (KR) .................. 10-2009-0107527
Nov. 11, 2009 (KR) .................. 10-2009-0108343

(51) Int. Cl.
H05B 37/02 (2006.01)
H05B 39/04 (2006.01)
(Continued)

(52) U.S. Cl.
CPC ........ *H05B 37/0272* (2013.01); *H05B 41/325* (2013.01); *H05B 33/0869* (2013.01); *H05B 37/02* (2013.01); *H05B 37/0218* (2013.01); *H05B 37/0227* (2013.01)

(58) Field of Classification Search
CPC .............. H05B 37/0272; H05B 37/02; H05B 37/0218; H05B 37/0227; H05B 41/325; H05B 33/0869
USPC ......................................... 315/151
See application file for complete search history.

(56) References Cited

U.S. PATENT DOCUMENTS

| 4,924,151 A | 5/1990 | D'Aleo et al. |
| 6,518,704 B1 | 2/2003 | Schuler |

(Continued)

FOREIGN PATENT DOCUMENTS

| CN | 1732099 A | 2/2006 |
| CN | 2807689 | 8/2006 |

(Continued)

OTHER PUBLICATIONS

Dong Hyun Kim et al., "The Design and Implementation of the Lamp Facility Management System based on Sensors," The Korean Institute of Marine Information and Communication Services, 2007, vol. 11, No. 7, pp. 1325 and 1331, ISSN 21223-6981.

Chinese Office Action, w/ English translation thereof, issued in Chinese Patent Application No. CN 201080060254.2 dated Dec. 4, 2013.

(Continued)

*Primary Examiner* — Alexander H Taningco
*Assistant Examiner* — Christian L Garcia
(74) *Attorney, Agent, or Firm* — F. Chau & Associates, LLC

(57) ABSTRACT

Disclosed is a lighting control apparatus. According to one embodiment of the present invention, a lighting system control be easily configured, maintained, and repaired since additional light and block control of the lighting can be provided with ease by wireless control of the lighting through wireless communication. In addition, the present invention can control individual lamps by storing a control signal corresponding to an address for each lamp in a gateway according to a predetermined scenario.

20 Claims, 5 Drawing Sheets

(51) Int. Cl.
*H05B 41/36* (2006.01)
*H05B 41/32* (2006.01)
*H05B 33/08* (2006.01)

(56) References Cited

U.S. PATENT DOCUMENTS

| | | | |
|---|---|---|---|
| 6,677,986 B1 | 1/2004 | Pochmuller | |
| 7,502,034 B2* | 3/2009 | Chemel | H05B 37/029 345/594 |
| 2005/0258954 A1 | 11/2005 | Ruskin | |
| 2006/0007011 A1* | 1/2006 | Chivarov | 340/815.45 |
| 2006/0170882 A1* | 8/2006 | Schwartz | G03B 21/2053 353/85 |
| 2008/0218087 A1* | 9/2008 | Crouse et al. | 315/131 |
| 2009/0261737 A1 | 10/2009 | Wright et al. | |
| 2010/0277106 A1 | 11/2010 | Baaijens | |
| 2010/0301781 A1* | 12/2010 | Budike, Jr. | H05B 37/0272 315/362 |
| 2011/0012512 A1* | 1/2011 | Young et al. | 315/117 |

FOREIGN PATENT DOCUMENTS

| | | |
|---|---|---|
| CN | 1969148 A | 5/2007 |
| CN | 201012648 | 1/2008 |
| CN | 101521972 A | 9/2009 |
| KR | 10-0719504 | 5/2007 |
| KR | 10-087905 | 12/2008 |
| WO | 2004/060716 A1 | 7/2004 |
| WO | 2009/081329 A1 | 7/2009 |
| WO | 2009/087537 A2 | 7/2009 |

OTHER PUBLICATIONS

Extended European Search Report issued in European Patent Application No. EP 10827173.5 dated May 17, 2013.
Chinese Office Action dated Aug. 15, 2014 issued in Chinese Patent Application No. 201080060254.2 (English translation).
Chinese Office Action issued in Chinese Application No. 201080060254.2 dated Sep. 16, 2015, with English translation.
Chinese office action issued in Chinese Application No. 201080060254.2 dated Feb. 28, 2015, with English translation.

* cited by examiner

200

LIGHTING CONTROL APPARATUS

TECHNICAL FIELD

The present invention relates to a lighting control apparatus.

BACKGROUND ART

A lighting device is a device for lighting a dark place to be recognizable with visual acuity of a human. A light emitting diode (LED), a fluorescent lamp, an incandescent lamp, and the like are generally employed.

In general, in the lighting device, each lamp is individually connected to a switching means and thereby is controlled to be on or off. Alternatively, a plurality of lamps is connected to a single wiring in a wired manner and thereby is controlled to be on or off.

Currently, development of an LED lighting device that is an environment friendly device, development of digital lighting control technology, researches on dimming technology for adjusting brightness of a lamp, researches on technology of adjusting a color temperature in association with the learning effect, and the like have been actively ongoing. Also, researches on technology of automatically controlling the entire lighting device of a building and digital control technology capable of controlling a lighting within a building in real time have been ongoing.

In addition to technologies of controlling a lighting device based on the user convenience, a lighting control system capable of differently controlling a lighting environment based on a lighting usage environment of a user has been developing. That is, researches on technology of controlling a plurality of lamps to be individually lit, technology of adjusting a dimming level by setting brightness of a plurality of lamps to be a predetermined level, technology of adjusting a color temperature or a color of a lamp based on a usage environment of a user, and the like have been conducted.

DISCLOSURE OF INVENTION

Technical Goals

An aspect of the present invention is to further easily configure, maintain, and repair a lighting system since an additional lighting or control block of a lighting may be provided with ease by wirelessly controlling the lighting through wireless communication.

Also, an aspect of the present invention is to individually control each lamp by storing, in a gateway, a control signal corresponding to each lighting address based on a predetermined scenario.

Also, an aspect of the present invention is to simplify a design and save costs by setting various scenarios based on a lighting environment desired by a user and by programming the set scenarios to a gateway and thereby reusing the scenarios.

Also, an aspect of the present invention is to provide various lighting environments based on a user setting since it is possible to individually or simultaneously adjust on/off, a dimming level, a color temperature, and a color of each lighting.

Also, an aspect of the present invention is to enhance the work efficiency of a worker by employing a motion sensor to thereby control a lighting to be automatically on while moving by, and to be automatically off while being stopped.

Also, an aspect of the present invention is to prevent waste of power by employing an illumination sensor and by supplying strength of a lighting suitable for a work environment.

Technical Solutions

According to an aspect of the present invention, there is provided a lighting control apparatus, including: a lighting module to emit light; and a control module to control an operation of the lighting module by outputting a control signal for controlling the operation of the lighting module.

Effect of the Invention

According to embodiments of the present invention, it is possible to further easily configure, maintain, and repair a lighting system since an additional lighting control block of a lighting may be provided with ease by wirelessly controlling the lighting through wireless communication.

Also, according to embodiments of the present invention, it is possible to individually control each lamp by storing, in a gateway, a control signal corresponding to each lighting address based on a predetermined scenario.

Also, according to embodiments of the present invention, it is possible to simplify a design and save costs by setting various scenarios based on a lighting environment desired by a user and by programming the set scenarios to a gateway and thereby reusing the scenarios.

Also, according to embodiments of the present invention, it is possible to provide various lighting environments based on a user setting since it is possible to individually or simultaneously adjust on/off, a dimming level, a color temperature, and a color of each lighting.

Also, according to embodiments of the present invention, it is possible to enhance the work efficiency of a worker by employing a motion sensor to thereby control a lighting to be automatically on while moving by, and to be automatically off while being stopped.

Also, according to embodiments of the present invention, it is possible to prevent waste of power by employing an illumination sensor and by supplying strength of a lighting suitable for a work environment.

BEST MODE FOR CARRYING OUT THE INVENTION

Figure 1:
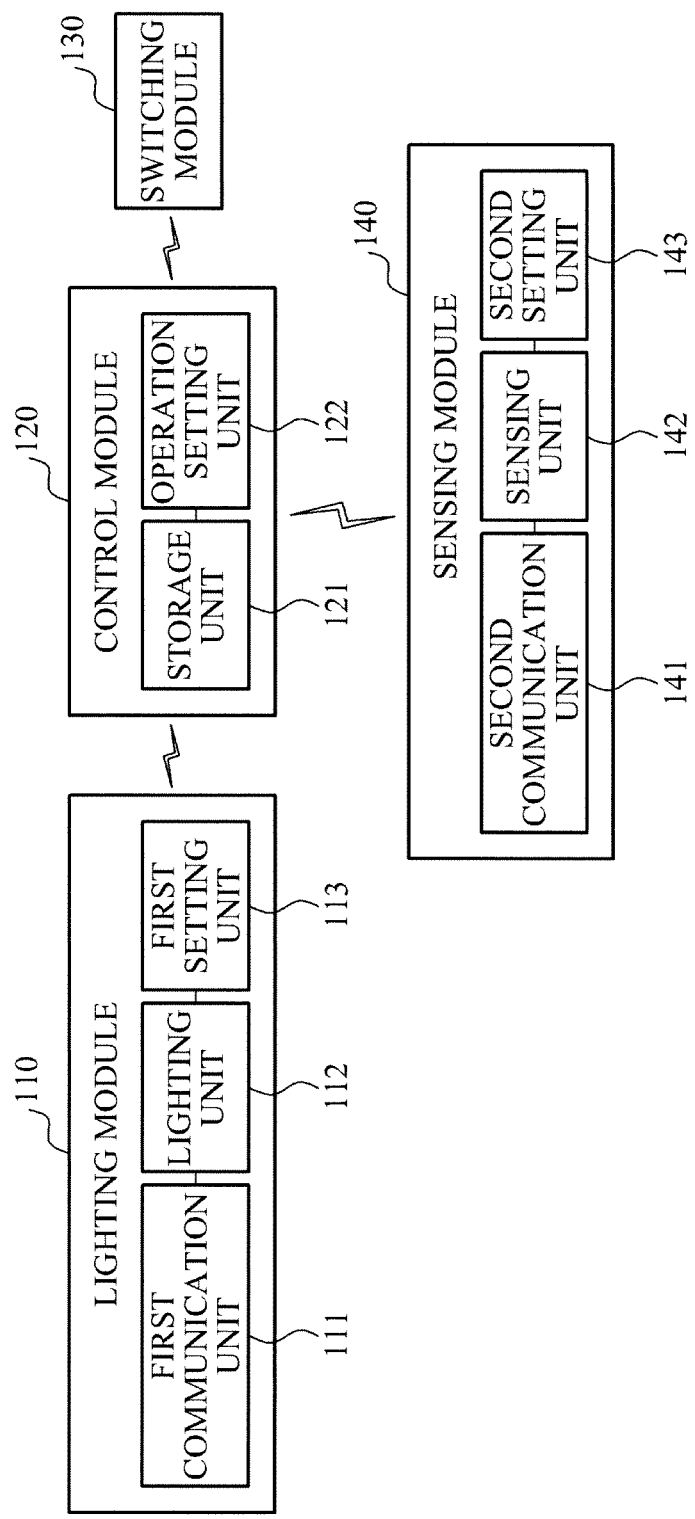
FIG. 1 is a block diagram illustrating a configuration of a lighting control apparatus according to an embodiment of the present invention.

Hereinafter, embodiments of the present invention will be described in detail with reference to the accompanying drawings. However, the present invention is not limited thereto or restricted thereby. Like reference numerals refer to the like elements throughout.

FIG. 1 is a block diagram illustrating a configuration of a lighting control apparatus according to an embodiment of the present invention.

Referring to FIG. 1, the lighting control apparatus may include a lighting module 110 and a control module 120.

The lighting module 110 may emit light. Depending on embodiments, the lighting module 110 may adjust an amount of light to be emitted, or may drive on or off a light emitting operation based on a control signal from the control module 120. Depending on embodiments, the lighting module 110 may be configured as a light emitting diode (LED).

The control module 120 may control an operation of the lighting module 110 by outputting a control signal for controlling the operation of the lighting module 110.

The control module 120 according to an embodiment may be provided in a form of a gateway to output a control signal. Also, the control module 120 may be configured as a server, a remote controller, and the like, and is not limited thereto.

According to an aspect of the present invention, the control module 120 may store a plurality of scenarios that matches at least one of an on/off control signal, a color temperature control signal, a color control signal, and a dimming control signal with respect to the lighting module 110. Depending on embodiments, the control module 120 may store a table that stores an address, an on/off control signal, a color temperature control signal, a color control signal, and a dimming control signal of the lighting module 110 based on each scenario.

Also, the control module 120 may output, to the lighting module 110, the control signal that matches the selected scenario.

According to an embodiment, the lighting control apparatus may further include a switching module 130.

A user using a lighting may select a single scenario from the plurality of scenarios. Here, the switching module 130 may receive a selection signal on any one of the plurality of scenarios from a user.

The switching module 130 may be provided in a form of a switch fixed on a wall, or a portable remote controller. Also, the switching module 130 may be integrally formed with the control module 120, or may be formed to be spaced apart from the control module 120.

When the switching module 130 is integrally formed with the control module 120, a button capable of selecting a scenario may be formed outside the control module 120 so that the user may select a desired scenario.

When the switching module 130 is formed to be spaced apart from the control module 120, the switching module 130 may transmit the received selection signal to the control module 120 in a wired or wireless manner. Here, a near field communication may employ a wireless communication method, for example, Bluetooth, ZigBee, and the like. Since a two-way communication is enabled, it is possible to check a state of a device of a counter party.

Also, based on the control signal that matches the received selection signal, the control module 130 may drive the lighting module 110 to be on or off, may adjust a color temperature or a color of the lighting module 110, or may adjust a dimming level of the lighting module 110.

According to an embodiment, the lighting module 110 may employ a digital lighting, particularly, an LED lighting of which a dimming level is adjustable.

Depending on embodiments, the switching module 130 may receive a scenario associated with an operation of the lighting module 110. Here, the control module 120 may store the received scenario. That is, a new scenario may be programmed in a table of a control signal according to the received scenario.

Hereinafter, examples of using a lighting control apparatus according to an embodiment of the present invention will be described with reference to FIGS. 2 and 3.

Figure 2:
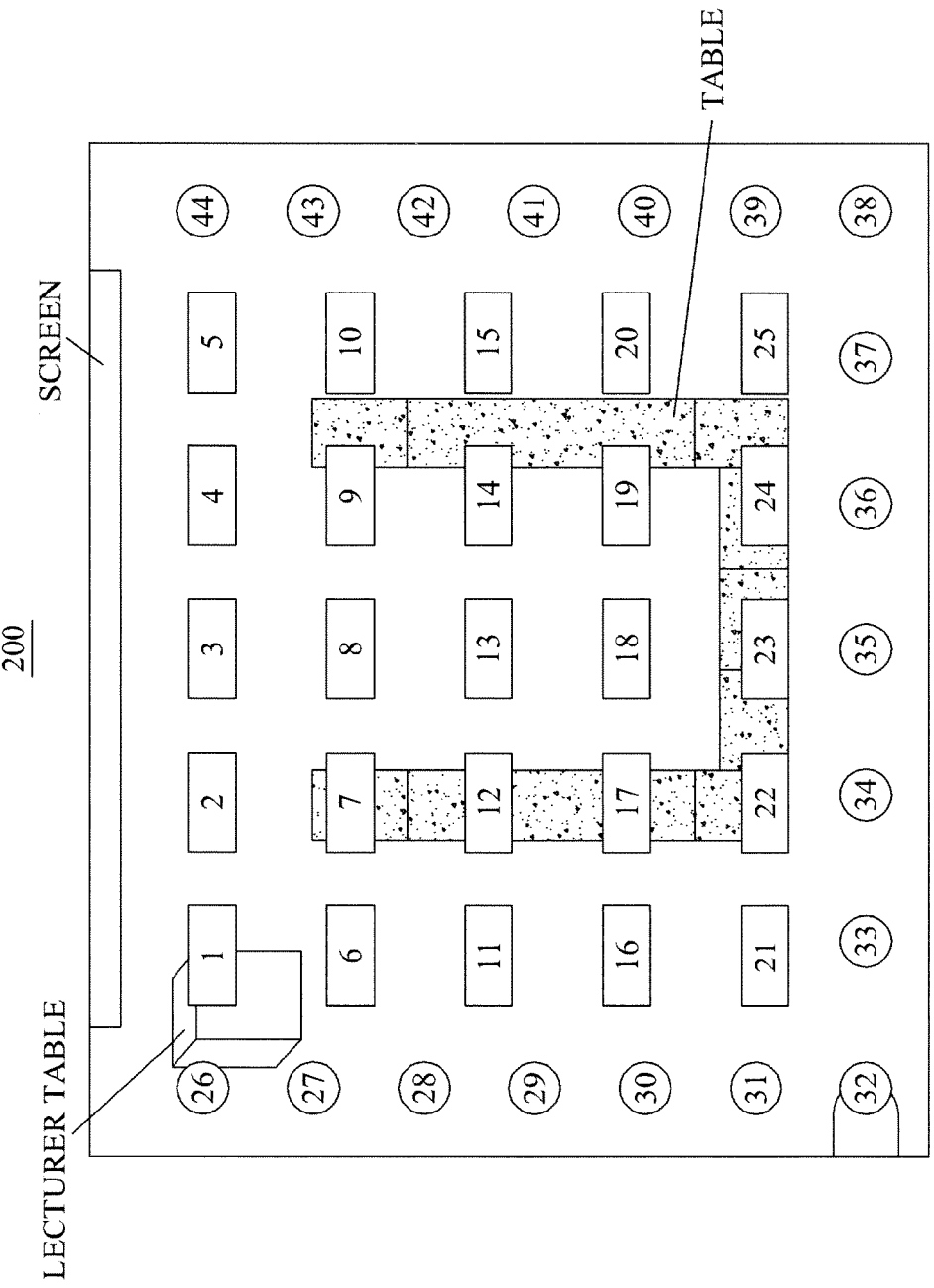
FIGS. 2 and 3 illustrate a usage state of a lighting control apparatus according to an embodiment of the present invention.
Figure 3:
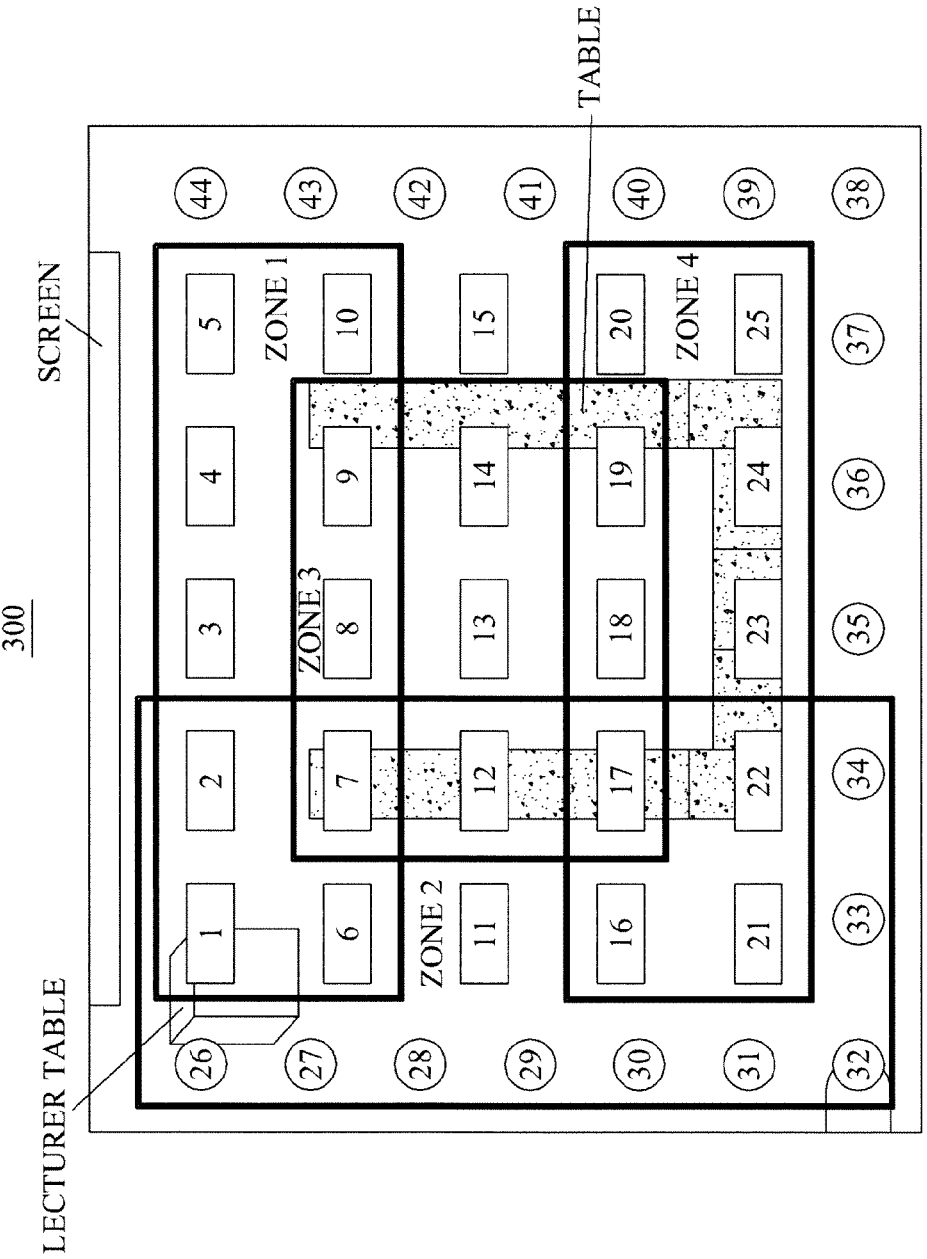

FIGS. 2 and 3 illustrate a usage state of a lighting control apparatus according to an embodiment of the present invention.

Referring to FIGS. 2 and 3, each of diagrams 200 and 300 illustrating a usage state of a lighting control system according to an embodiment of the present invention corresponds to a lighting environment in which a plurality of lamps 1 through 44 corresponding to a lighting module is arranged at predetermined intervals within a classroom, a screen is installed in a front of the classroom, and a table is provided in a form of a flattened—"U" shape.

The lighting environment within the classroom may be classified into scenarios, for example, a presentation, viewing a moving picture, lecture, unsupervised learning or individual task time, conversation time, break time, rational thinking time, creative thinking time, memorizing time, and the like, and thereby be differently created.

The following Table 1 shows an example of on/off, color temperature, and dimming operation of a plurality of lightings according to nine scenarios.

TABLE 1

| Switching Means No. | Scenario | Lamp Address |
|---|---|---|
| 1 | Presentation | 1~5, 26, 44: off<br>6~25, 27~43: on |
| 2 | Viewing a moving picture | 1~5, 26, 44: off<br>6~10: five stages of dimming<br>11~25, 27~43: on |
| 3 | Lecture | 1, 2, 6, 26, 27: on<br>3~5, 7~25, 28~44: five stages of dimming |
| 4 | Unsupervised learning or individual task time | 7~9, 12~14, 17~19, 22~24: on<br>1~6, 10, 11, 15, 16, 20, 21, 25~44: five stages of diming |
| 5 | Conversation time | 1~44: Seven stages of dimming |
| 6 | Break time | 1~25: five stages of dimming<br>26~44: on |
| 7 | Rational thinking time | 1~25: color temperature 6500 K<br>26~32: color temperature 4500 K<br>33~44: color temperature 4000 K |
| 8 | Creative thinking time | 1~25: color temperature 3000 K<br>26~32: color temperature 2500 K<br>33~44: color temperature 2700 K |
| 9 | Memorizing time | 1~25: color temperature 4000 K<br>26~32: color temperature 3500 K<br>33~44: color temperature 3800 K |

When a user desires the lighting environment for presentation, scenario information corresponding to number 1 may be transferred from a switching module to ae control module if the user pushes a button number 1 of the switching module corresponding to the switching means.

The control module may output a control signal for driving lamps 1 to 5, 26, and 44 to be off and driving lamps 6 to 25 and 27 to 43 to be on according to the presentation scenario that is a scenario corresponding to number 1 of the switching module.

Also, as shown in FIG. 3, different lighting environments may be created by dividing the classroom into three zones. Here, the control module may output different control signals to lamps that are included in each zone.

The control module may store, in the following Table 2, an address, an on/off control signal, a color temperature control signal, or a dimming control signal of each of the plurality of lamps according to each scenario.

TABLE 2

|  | 1 | 2 | 3 | 4 | 5 | 6 | 7 | 8 | 9 | 10 | ... | 42 | 43 | 44 |
|---|---|---|---|---|---|---|---|---|---|---|---|---|---|---|
| Scenario 1 | off | off | off | off | off | on | on | on | on | on |  | on | on | off |
| Scenario 2 | off | off | off | off | off | 5-D | 5-D | 5-D | 5-D | 5-D |  | on | on | off |
| Scenario 3 | on | on | 5-D | 5-D | 5-D | on | 5-D | 5-D | 5-D | 5-D |  | 5-D | 5-D | 5-D |

Accordingly, the lighting control apparatus according to an embodiment of the present invention may create various lighting environments desired by a user without a need to change a wiring of a lamp.

Referring again to FIG. 1, according to an aspect of the present invention, the control module 120 may output a control signal to the lighting module 110 using near field communication.

A wireless communication scheme may include a Bluetooth scheme, a wireless local area network (WLAN) scheme, a ZigBee communication scheme, and the like.

According to an embodiment, the lighting module 110 may include predetermined network information. Also, the lighting module 110 may be controlled using a predetermined communication scheme. Depending on embodiments, the predetermined communication scheme may be a ZigBee communication scheme.

According to an embodiment, the network information may include at least one of a network ID, for example, a personal area network (PAN) ID as the same meaning, a communication channel, and a device address associated with the lighting module 110.

The control module 120 may receive the network information from the lighting module 110 using a predetermined communication scheme. Also, the control module 120 may control an operation of the lighting module 110 by configuring a wireless network based on the network information. Also, the control module 120 may output a control signal to the lighting module 110 over the wireless network.

According to an aspect of the present invention, the lighting module 110 may include a first communication unit 111, a lighting unit 112, and a first setting unit 113.

Using a ZigBee communication scheme, the first communication unit 111 may transmit the network information to the control module 120, and may receive the control signal from the control module 120.

The lighting unit 112 may emit light corresponding to the control signal that is received using the ZigBee communication scheme.

The first setting unit 113 may set the network information.

According to an embodiment, the first setting unit 113 may include a first network ID setting dip switch, a first communication channel setting dip switch, and a first device address setting dip switch.

The first network ID setting dip switch may have a predetermined first bit count, and may set the network ID to correspond to the first bit count;

The first communication channel setting dip switch may have a predetermined second bit count, and may set the communication channel to correspond to a second bit count.

The first device address setting dip switch may have a predetermined third bit count, and may set the device address to correspond to the third bit count.

Hereinafter, a dip switch according to an embodiment of the present invention will be described.

Figure 4:
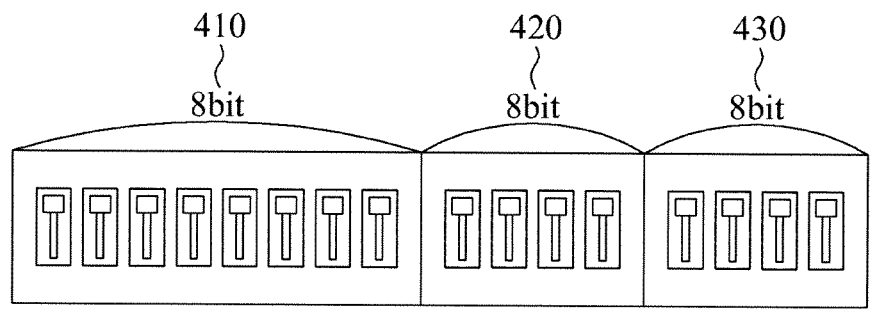
FIG. 4 is a diagram illustrating a dip switch for a lighting module according to an embodiment of the present invention.

FIG. 4 is a diagram illustrating a dip switch for a lighting module according to an embodiment of the present invention.

Referring to FIG. 4, a first network ID setting dip switch 410 according to an embodiment of the present invention may have eight bits. Also, each of a first communication channel setting dip switch 420 and a first device address setting dip switch 430 may have four bits.

The first network ID setting dip switch 410, the first communication channel setting dip switch 420, and the first device address setting dip switch 430 may set a network ID, a communication channel, and a device address, respectively, by turning on or off a switch corresponding to assigned bits, and by setting each bit to zero or '1'. The network information of the lighting module may be transmitted to a control module to configure a network.

Referring again to FIG. 1, a plurality of lighting modules 110 may be provided depending on embodiments. Here, the control module 120 may control the plurality of lighting modules 110 by setting the plurality of lighting modules 110 as at least one group.

For example, a portion of the plurality of lighting modules 110 may be set as a first group, and remaining lighting modules 110 may be set as a second group. Here, a lighting module included in the first group may be lit up or lit out via a switch 1. Also, a lighting module included in the second group may be lit up or lit out via a switch 2. Also, dimming of a lighting module included in a selected group may be controlled.

Hereinafter, a group control operation of a control module with respect to a lighting module according to an embodiment of the present invention will be described with reference to FIG. 5.

Figure 5:
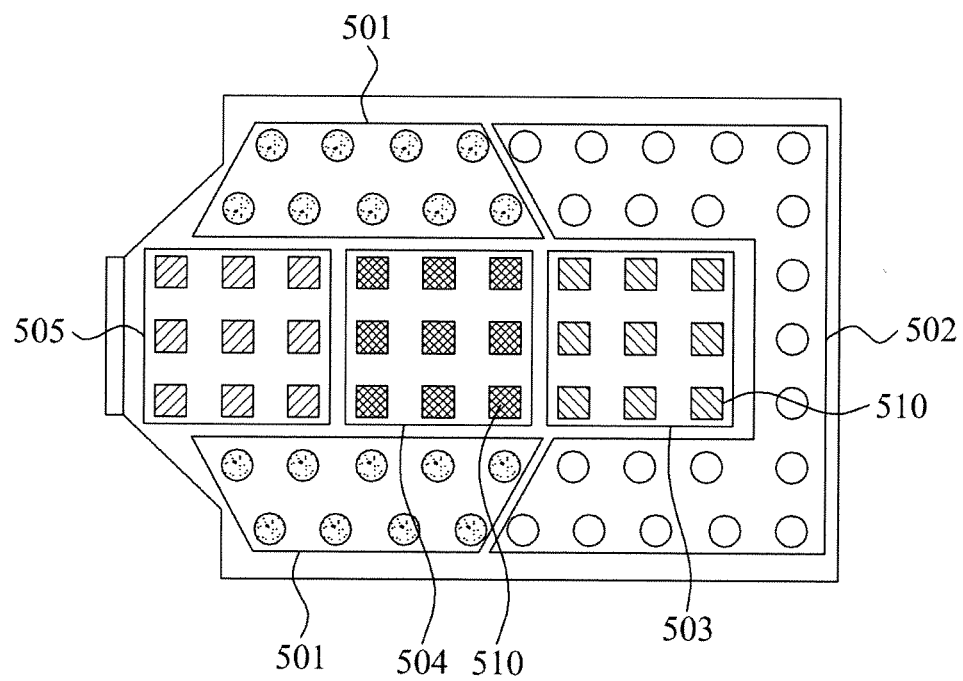
FIG. 5 is a diagram illustrating a block setting of a wireless lighting control apparatus according to an embodiment of the present invention.

FIG. 5 is a diagram illustrating a block setting of a wireless lighting control apparatus according to an embodiment of the present invention.

Referring to FIG. 5, a plurality of lighting modules 510 may be installed on the ceiling of an office or a building. Here, a control module may set a plurality of lighting modules 510 for each group based on network information of the lighting modules 510. According to an embodiment, the control module may set the plurality of lighting modules 510 into five groups 501, 502, 503, 504, and 505, based on a type, an installation location, and the like of lighting. Here, the control module may set switches 1, 2, 3, 4, and 5, starting with the switch 1, to control the groups 501 through 505, respectively. Also, the control module may control light-up, light-out, or dimming operation of a lighting based on a group unit that matches a selection of a switch.

Here, the lighting module 510 set as a group may be in a standby state. When a control signal from the control module is a signal corresponding to the group belonged by the lighting module 510, the lighting module 510 may perform a corresponding operation and otherwise, may maintain to be in a standby state.

Depending on embodiments, the lighting module 510 belonging to a group may change the group that the light module 510 belongs to. When the lighting module 510 desires to change the belonging group, the lighting module 510 may transmit a group change request signal to the control module. In response to the group change request signal, the control module may transmit a group setting command to the corresponding lighting module 510.

Referring again to FIG. 1, the lighting control apparatus according to an aspect of the present invention may further include a sensing module 140.

The sensing module 140 may sense a state of the lighting module 110. The sensing module 140 may be installed on the ceiling, wall, and the like of a house, an office, a building, and the like.

Depending on embodiments, a plurality of sensing modules 140 may be provided.

According to an embodiment, the sensing module 140 may sense at least one of an illumination, a color temperature, a color, and a motion of the lighting module 110. Also, according to an embodiment, the sensing module 140 may sense a peripheral illumination of the lighting module 110. Also, according to an embodiment, the sensing module 140 may include a temperature sensor, a smoke sensor, a gas sensor, and the like.

According to an aspect of the present invention, the sensing module 140 may sense a motion of the lighting module 110 and a peripheral illumination of the lighting module 110. For example, the lighting module 110 may be attached to a container and thereby be implemented, or may be applied to a headlight of a vehicle. Here, the sensing module 140 may include a motion sensor, and the motion sensor may sense a motion of the container or the vehicle.

In this instance, when the lighting module 110 is sensed to be moving, and when the peripheral illumination of the lighting module 110 is less than a reference value, the control module 120 may control the lighting module 110 to emit light.

Depending on embodiments, the control module 120 may adjust light emitting intensity of the lighting module 110 based on a peripheral illumination value of the lighting module 110. According to an embodiment, the control module 120 may compare and determine the range of illumination values and thereby determine the light emitting intensity of the lighting module 110. Also, the control module 120 may output a signal about the determined light emitting signal to the lighting module 110.

Accordingly, the control module 120 may call attention of an operator, or may enable a driver to secure front visibility of a vehicle.

Depending on embodiments, the sensing module 140 may use various types of sensors according to the conventional art, for example, an acceleration sensor, a terrestrial magnetism sensor, and the like. The acceleration sensor may include a sensor module corresponding to each axis, as a sensor to detect motion of axes X, Y, and Z. The terrestrial magnetism sensor is a sensor to detect tilting, and may use a characteristic that a value of Earth's magnetic field varies along with a tilting of the terrestrial magnetism sensor.

For example, a three-dimensional (3D) acceleration sensor may include an X-axial detector, a Y-axial detector, and a Z-axial detector corresponding to the axes X, Y, and Z, respectively. Each of the X-axial detector, the Y-axial detector, and the Z-axial detector may include a capacitor therein. Using a characteristic that a value of each capacitor within the X-axial detector, the Y-axial detector, and the Z-axial detector varies according to a motion of the lighting module 110, the X-axial detector, the Y-axial detector, and the Z-axial detector may detect acceleration ax, ay, and az of the respective X-axial, Y-axial, and Z-axial directions.

Depending on embodiments, the sensing module 140 may measure the peripheral illumination using an optical sensor and the like. The lighting module 110 may call the attention of an operator by brightening up in a sealed and dark environment or during a night work, and enables a driver to secure visibility while driving at night. Accordingly, when at least a predetermined level of illumination is secured despite of self-motion, for example, while driving during a day time, there is no need to light a lighting. Also, when there is a need to inform an operator about movement of a container due to a low peripheral illumination, which may occur on, for example, a raining day even during a day time, there is a need to light a lighting. Accordingly, the lighting module 110 may be controlled to emit light based on an illumination value measured by the sensing module 140.

According to an aspect of the present invention, the sensing module 140 may include predetermined network information. Also, the sensing module 140 may be controlled using a predetermined communication scheme. Depending on embodiments, the predetermined communication scheme may be a ZigBee communication scheme.

According to an embodiment, the network information may include at least one of a network ID, a communication channel, and a device address associated with the sensing module 140.

The control module 120 may configure a wireless network based on the network information. Also, the control module 120 may request the sensing module 140 for sensing information over the wireless network.

According to an aspect of the present invention, the sensing module 140 may include a second communication unit 141, a sensing unit 142, and a second setting unit 143.

Using a ZigBee communication scheme, the second communication unit 141 may transmit the network information to the control module, and may receive a request signal for the sensing information from the control module.

The sensing unit 142 may provide the sensing information in response to the request signal that is received using the ZigBee communication scheme.

The second setting unit 143 may set the network information.

According to an embodiment, the second setting unit 143 may include a second network ID setting dip switch, a second communication channel setting dip switch, and a second device address setting dip switch.

The second network ID setting dip switch may have a predetermined fourth bit count, and may set the network ID to correspond to the fourth bit count.

The second communication channel setting dip switch may have a predetermined fifth bit count, and may set the communication channel to correspond to a fifth bit count.

The second device address setting dip switch may have a predetermined sixth bit count, and may set the device address to correspond to the sixth bit count.

According to an aspect of the present invention, the sensing module 140 may sense an output signal of the lighting module 110.

Here, the control module 120 may calculate a difference between a lighting emitting signal input to the lighting module 110 and the output signal by comparing the lighting emitting signal and the output signal. The light emitting signal may include information about at least one of an illumination, a color temperature, and a color with respect to the lighting module 110.

The control module 120 may control the operation of the lighting module 110 based on the calculated difference. Depending on embodiments, the control module 120 may maintain the light emitting signal when the calculated difference is less than a reference value, and may change the lighting emitting signal when the calculated difference is greater than or equal to the reference value.

According to an embodiment, the control module 120 may include a storage unit 121 and an operation setting unit 122.

The storage unit 121 may store characteristic information of the lighting module 110. According to an embodiment, the characteristic information of the lighting module 110 may include a device address, a type of a lighting, and the like.

The operation setting unit 122 may set the operation of the control module 120 based on the characteristic information of the lighting module 110. Depending on embodiments, the operation setting unit 122 may set a switching operation of the switching module 130.

For example, when the switching module 130 includes a switch 1 to a switch 9, the switching module 130 may set each switch to control on/off of the different light modules 110, and may also set each switch to control an illumination of a lighting module selected by each of up/down switches of the switching module 130 to be bright or dark. Depending on embodiments, the operation setting unit 122 may set each of the switches 1 through 9 of the switching module 130 to simultaneously control the plurality of lighting modules 110. Accordingly, when a predetermined number of switch is selected in the control module 120, a plurality of lighting modules of a predetermined location may emit light or be turned off.

Hereinafter, an example of a lighting control apparatus according to an embodiment of the present invention will be described.

Figure 6:
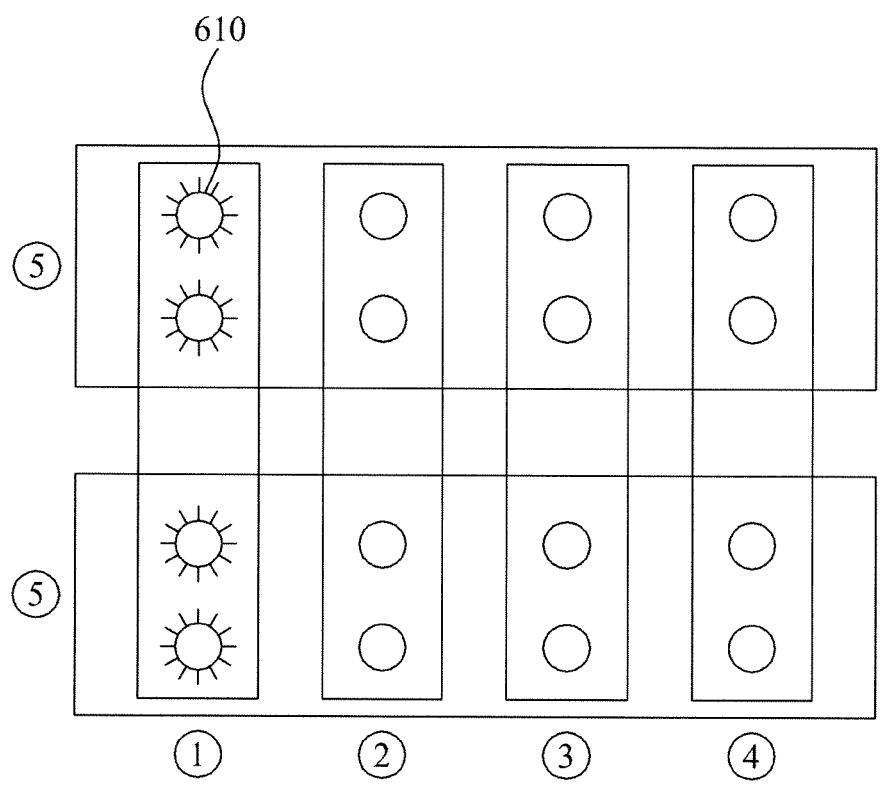
FIG. 6 is a diagram illustrating an example applied with a lighting control apparatus according to an embodiment of the present invention.

FIG. 6 is a diagram illustrating an example applied with a lighting control apparatus according to an embodiment of the present invention.

Referring to FIG. 6, according to an aspect of the present invention, 16 lighting modules 610 may be provided on the ceiling of an office. An operation setting unit may set a zone based on a lighting type or position of each lighting module 610, and may also set a switch of a switching module to simultaneously control operations of the lighting modules 610 within the zone.

For example, the operation setting unit may set each of switches 1 to 6 of the switch modules to simultaneously control the lighting modules 610 included in each different zone.

Referring again to FIG. 1, according to an aspect of the present invention, the lighting control apparatus may further include a power module.

The power module (not shown) may supply power to the lighting control apparatus.

According to an aspect of the present invention, the control module 120 may control an operation of a warning light informing a driver about a coming danger. That is, according to an embodiment, the control module 120 may control light-up of the warning light.

Also, the control module 120 may control operations of a plurality of lighting modules 110 installed in a tunnel based on a travel direction of a vehicle. The control module 120 may control the plurality of lighting modules 110 to be sequentially lit up.

For example, the control module 120 may control a flickering period of the warning light to increase with getting closer towards a lighting portion of a tunnel entrance from a lighting portion within the tunnel. Also, the control module 120 may control a lighting color of the warning light to be gradually gradated with getting closer towards a lighting portion of a tunnel entrance from a lighting portion within the tunnel. Also, the control module 120 may control the flickering period of the warning light to increase and, at the same time, also control the lighting color of the warning light to be gradually gradated with getting closer towards a lighting portion of a tunnel entrance from a lighting portion within the tunnel.

According to an aspect of the present invention, the control module 120 may receive emergency occurrence information about a predetermined area from a traffic information collecting apparatus.

When the emergency occurrence information is received from the traffic information collecting apparatus, the control module 120 may change a state of a streetlight adjacent to the predetermined area where the emergency has occurred. Here, the lighting module 110 may be used as a lighting of the streetlight.

For example, the control module 120 may control a dimming speed of a streetlight, positioned further away from the area where the emergency has occurred, to further decrease.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

EXPLANATION OF REFERENCE NUMERALS

110: Lighting module
120: Control module
130: Switching module
140: Sensing module

The invention claimed is:

1. A lighting control apparatus, comprising:
a lighting module configured to emit light and having a first device address setting dip switch to set a device address associated with the lighting module; and
a control module configured to control an operation of the lighting module by outputting a control signal for controlling the operation of the lighting module,
wherein:
the lighting module comprises predetermined network information, and
the control module configures a wireless network based on the network information and outputs the control signal to the lighting module over the wireless network,
wherein the network information comprises at least one of a network identifier (ID) and a communication channel,
wherein the lighting module comprises a first setting unit,
wherein the first setting unit comprises:
a first network ID setting dip switch to have a predetermined first bit count, and to set the network ID to correspond to the first bit count;
a first communication channel setting dip switch to have a predetermined second bit count, and to set the communication channel to correspond to a second bit count; and
the first device address setting dip switch,
wherein the first device address setting dip switch has a predetermined third bit count, and is configured to set the device address to correspond to the third bit count.

2. The lighting control apparatus of claim 1, wherein the control module stores a plurality of scenarios that matches at least one of on/off control signal, a color temperature control signal, a color control signal, and a dimming control signal with respect to the lighting module.

3. The lighting control apparatus of claim 2, further comprising:
a switching module to receive, from a user, a selection signal on any one of the plurality of scenarios.

4. The lighting control apparatus of claim 3, wherein the control module drives the lighting module to be on or off, adjusts a color temperature or a color of the lighting module, or adjusts a dimming level of the lighting module, based on a control signal that matches the received selection signal.

5. The lighting control apparatus of claim 3, wherein:
the switching module receives a scenario associated with the operation of the lighting module, and
the control modules stores the received scenario.

6. The lighting control apparatus of claim 1, wherein the control module outputs the control signal to the lighting module using a near field communication.

7. The lighting control apparatus of claim 1, wherein the network information further comprises the device address associated with the lighting module.

8. The lighting control apparatus of claim 7, wherein the lighting module further comprises:
a first communication unit to transmit the network information to the control module, and to receive the control signal from the control module using a ZigBee communication scheme;
a lighting unit to emit light corresponding to the control signal that is received using the ZigBee communication scheme; and
the first setting unit to set the network information.

9. The lighting control apparatus of claim 1, wherein:
the lighting module is provided to be plural, and
the control module controls the plurality of lighting modules by setting the plurality of lighting modules as at least one group.

10. The lighting control apparatus of claim 1, further comprising:
a sensing module to sense a state of the lighting module.

11. The lighting control apparatus of claim 10, wherein the sensing module senses at least one of an illumination, a color temperature, a color, and a motion of the lighting module.

12. The lighting control apparatus of claim 10, wherein:
the sensing module senses a motion of the lighting module and a peripheral illumination of the lighting module, and
when the lighting module is sensed to be moving and when the peripheral illumination is less than a reference value, the control module controls the lighting module to emit light.

13. The lighting control apparatus of claim 10, wherein:
the sensing module comprises predetermined network information, and
the control module configures a wireless network based on the network information, and requests the sensing module for sensing information through the wireless network.

14. The lighting control apparatus of claim 13, wherein the network information comprises the device address associated with the sensing module, and at least one of a network ID and a communication channel.

15. The lighting control apparatus of claim 14, wherein the sensing module comprises:
a communication unit configured to transmit the network information to the control module, and to receive a request signal for the sensing information from the control module using a ZigBee communication scheme;
a sensing unit configured to provide the sensing information in response to the request signal that is received using the ZigBee communication scheme; and
a second setting unit configured to set the network information.

16. The lighting control apparatus of claim 15, wherein the second setting unit comprises:
a second network ID setting dip switch to have a predetermined fourth bit count, and to set the network ID to correspond to the fourth bit count;
a second communication channel setting dip switch to have a predetermined fifth bit count, and to set the communication channel to correspond to a fifth bit count; and
a second device address setting dip switch to have a predetermined sixth bit count, and to set the device address to correspond to the sixth bit count.

17. The lighting control apparatus of claim 10, wherein:
the sensing module senses an output signal of the lighting module, and
the control module calculates a difference between a lighting emitting signal input to the lighting module and the output signal by comparing the lighting emitting signal and the output signal, and controls the operation of the lighting module based on the calculated difference.

18. The lighting control apparatus of claim 17, wherein the lighting emitting signal comprises information about at least one of an illumination, a color temperature, and a color with respect to the lighting module.

19. The lighting control apparatus of claim 17, wherein the control module maintains the light emitting signal when the calculated difference is less than a reference value, and changes the lighting emitting signal when the calculated difference is greater than or equal to the reference value.

20. The lighting control apparatus of claim 1, wherein the control module comprises:
- a storage unit to store characteristic information of the lighting module; and
- an operation setting unit to set the operation of the control module based on the characteristic information of the lighting module.

* * * * *